(12) United States Patent
Morishita

(10) Patent No.: US 7,736,789 B2
(45) Date of Patent: Jun. 15, 2010

(54) FUEL CELL HAVING UNIT CELLS ARRANGED TO MERGE GASES GENERATED IN THE UNIT CELLS

(75) Inventor: Satoshi Morishita, Kyoto-fu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/642,020

(22) Filed: Dec. 20, 2006

(65) Prior Publication Data

US 2007/0166597 A1 Jul. 19, 2007

(30) Foreign Application Priority Data

Jan. 13, 2006 (JP) .............................. 2006-005958
Nov. 27, 2006 (JP) .............................. 2006-318569

(51) Int. Cl.
H01M 2/14 (2006.01)
(52) U.S. Cl. .......................................... 429/38; 429/39
(58) Field of Classification Search .................. 429/32, 429/38, 39; 138/39
See application file for complete search history.

(56) References Cited

U.S. PATENT DOCUMENTS 3,411,951 A * 11/1968 Gelting ........................ 429/26
3,615,839 A * 10/1971 Thompson et al. ............ 429/16
3,615,948 A * 10/1971 Krostewitz ................... 216/13
3,841,568 A * 10/1974 Broad ......................... 239/590
4,201,838 A *  5/1980 Goldberg ..................... 429/145
5,364,711 A   11/1994 Yamada et al.
6,077,620 A *  6/2000 Pettit .......................... 429/26
6,361,294 B1* 3/2002 Witzigreuter et al. ..... 417/413.3
6,465,119 B1* 10/2002 Koripella et al. ............. 429/32
6,492,047 B1* 12/2002 Peled et al. ................... 429/30
2002/0197522 A1* 12/2002 Lawrence et al. ............. 429/34
2004/0146772 A1*  7/2004 Miyao et al. .................. 429/38

FOREIGN PATENT DOCUMENTS

JP       6-188008    7/1994
JP       97/21256    6/1997
JP       11-510311   9/1999

* cited by examiner

Primary Examiner—Dah-Wei D Yuan
Assistant Examiner—Maria J Laios
(74) Attorney, Agent, or Firm—Nixon & Vanderhye P.C.

(57) ABSTRACT

A fuel cell has unit cells wherein gas discharged from an oxidizer electrode in one unit cell and gas discharged from a fuel electrode in other adjacent unit cell are merged in and charged through a discharge flow passage provided outside these unit cells. The discharge flow passage is shared by the oxidizer electrode in the one unit cell and the fuel electrode in the other unit cell. A flow of the gas discharged from the oxidizer electrode is utilized to efficiently exhaust the gas discharged from the fuel electrode.

17 Claims, 10 Drawing Sheets

FUEL CELL HAVING UNIT CELLS ARRANGED TO MERGE GASES GENERATED IN THE UNIT CELLS

CROSS-REFERENCE TO RELATED APPLICATION

This nonprovisional application claims priority under 35 U.S.C. §119(a) on Patent Application No. 2006-005958 filed in Japan on 13 Jan. 2006 and No. 2006-318569 filed in Japan on 27 Nov. 2006, the entire contents of which are incorporated herein by reference.

BACKGROUND OF THE INVENTION

The present invention relates to a fuel cell supplied with liquid fuel, and more particularly, to a fuel cell suitable for size reduction.

The fuel cell is an electric power generation device which generates electric power by supply of fuel and oxidizer. Since air is generally used as the oxidizer, the fuel cell is capable of continuous power generation by replacement of a fuel container. Therefore, the fuel cell has been drawing great attention not only as stationary power supply but also as portable power supply.

In stationary fuel cells, hydrogen gas or a gas containing hydrogen is generally used as a fuel. For the portable power supply, however, it is advantageous to be capable of generating electric power for longer time by using the fuel stored in an identical size container, and therefore, liquid fuels which are higher in energy density per volume are more advantageous than gas.

For power generation, it is also possible to use hydrogen which a reformer generates from a liquid fuel. However, the reformer complicates the whole fuel cell system, and it is considered that direct supply of liquid fuel easily achieves size reduction of the fuel cell system.

As an example of the fuel-direct-supply type fuel cell, a direct methanol fuel cell has been conventionally disclosed (JP 11-510311 A, JP 6-188008 A), wherein a mixture of methanol and water is used as fuel.

A typical direct methanol fuel cell is explained with reference to FIG. 6.

The direct methanol fuel cell is provided with a fuel electrode 103, an oxidizer electrode 102 and an electrolyte membrane 101 in a housing 116, as shown in FIG. 6. Firstly, mixture fuel of methanol and water is fed from a fuel tank (not shown) to a fuel introduction passage 108 by using a feeding means such as a feed pump. The fuel, which is fed to the fuel introduction passage 108, is then fed to a fuel electrode chamber 106 formed in a separator 105 along a direction shown by an arrow 110. The fuel, which is fed into the fuel electrode chamber 106, penetrates into the fuel electrode 103 and reacts so as to generate protons (hydrogen ions), electrons and carbon dioxide. A porous material is normally used for the fuel electrode 103, so that the reaction of the fuel electrode 103 takes place on a layer thereof in proximity to the interface with the electrolyte membrane 101, which layer carries a catalyst.

The protons, which are generated in the fuel electrode 103, move from the fuel electrode 103, permeate the electrolyte membrane 101, and move to the oxidizer electrode 102. The electrons flow from the fuel electrode 103 via an external circuit (not shown) to the oxidizer electrode 102. These electrons are used as an output of the cell. Meanwhile, the carbon dioxide is discharged from the fuel electrode 103 through the fuel electrode chamber 106, along with the unreacted fuel.

Also, oxygen is fed to an oxidizer electrode chamber 104 formed in the separator 105 along a direction shown by an arrow 111. The oxygen is then diffused from the oxidizer electrode chamber 104 into the oxidizer electrode 102 and reacts with the protons that have diffused from the fuel electrode 103 so as to generate water. The generated water, which is normally in the form of water vapor, and the unreacted oxygen are discharged from an exit of the oxidizer electrode chamber 104 in a direction shown by an arrow 112. Oxygen is used as an oxidizer in this example. Air may also be used although its oxygen concentration is lower.

It should be noted that, in the above conventional direct methanol fuel cell, carbon dioxide discharged from the fuel electrode chamber 106 and gas emitted from the oxidizer electrode chamber 104 have to be discharged independently of each other. This is because the separator 105 separates the fuel electrode chamber 106 from the oxidizer electrode chamber 104, as shown in FIG. 6. Accordingly, in this conventional fuel cell, an exhaust means such as a pump is needed for each of the oxidizer electrode chamber 104 and the fuel electrode chamber 106, which becomes an obstacle to size reduction. Eliminating a pump or other forcible exhaust means provided for exhaust of carbon dioxide in the fuel electrode chamber 106 would cause the efficiency in carbon dioxide exhaust to be lower, which causes a power decrease.

BRIEF SUMMARY OF THE INVENTION

A fuel cell has been developed which is capable of efficiently discharging exhaust gas from the fuel electrode and the oxidizer electrode and which makes it possible to achieve size reduction and improvement in power density per volume.

A fuel cell has been developed having a plurality of multilayered unit cells, each of the unit cells comprising:
  a fuel chamber to which a liquid fuel is supplied;
  a fuel electrode which is adjacent to the fuel chamber and to which the liquid fuel is supplied from the fuel chamber and by which cation and electrons are generated from the liquid fuel;
  an electrolyte membrane which is placed so as to face the fuel electrode and through which cations derived from the fuel electrode permeate;
  an oxidizer chamber to which an oxidizer is supplied; and
  an oxidizer electrode which is adjacent to the oxidizer chamber and to which the oxidizer is supplied from the oxidizer chamber and which is placed so as to face the electrolyte membrane and which yields a reaction between the oxidizer and the cations permeated through the electrolyte membrane, wherein
  gas generated from a fuel electrode in one unit cell among the unit cells is discharged into one fuel chamber adjacent to the fuel electrode,
  gas generated from an oxidizer electrode of another unit cell adjacent to the one unit cell and discharged into one oxidizer chamber adjacent to the oxidizer electrode,
  the gas generated from the fuel electrode and the gas generated from the oxidizer electrode are merged with each other to be discharged from the multilayered unit cells.

The gas discharged from the fuel electrode may be discharged by using a same exhaust system as that for the gas discharged from the oxidizer electrode. Further, the gas discharged from the fuel electrode side is efficiently exhausted by making use of the flow of the gas discharged from the oxidizer electrode. Thus, it possible to realize a size reduction and improvement of power density per volume of the fuel cell.

The fuel cell may further comprise a merging discharge structure for merging and discharging gas discharged from the fuel chamber of the one unit cell and gas discharged from the oxidizer chamber of the other unit cell.

According to the fuel cell of this embodiment, the merging discharge structure makes it possible to form a discharge flow passage in each unit cell, which passage realizes a more stable flow of discharge gas, as compared with the case where the supply sections are provided on the supply sides of the liquid fuel and the oxidizer. Thereby, the gas led to the fuel chamber is efficiently discharged.

Two adjacent unit cells from among the plurality of unit cells may be placed in such a way that a fuel chamber of one unit cell and an oxidizer chamber of other unit cell adjoin each other.

According to the fuel cell of this embodiment, the fuel chamber of one unit cell and the oxidizer chamber of the other unit cell are adjacent to each other. Therefore, it is possible to minimize the increase in the thickness due to the multilayering of unit cells. Otherwise, that is, in the case where the fuel chamber of one unit cell and the oxidizer chamber of the other unit cell are not adjacent to each other, it is difficult to suppress the increase in thickness due to the multilayering. This is because a connection is additionally required for a flow passage which merges and exhausts the gases discharged from the fuel chamber and the oxidizer chamber.

The fuel cell may further comprise a preliminary exhaust chamber between the fuel chamber of the one unit cell and the oxidizer chamber of the other unit cell so as to lead discharged from the fuel chamber of the one unit cell and gas discharged from the oxidizer chamber of the other unit cell to a discharge port gas.

According to the fuel cell of this embodiment, the preliminary exhaust chamber is between the fuel chamber of one unit cell and the oxidizer chamber of the other unit cell. Thereby, it is possible to prevent the gas discharged from the fuel electrode from diffusing to the oxidizer chamber. This inhibits any reactions non-contributive to the power generation at the oxidizer electrode.

The preliminary exhaust chamber may be provided with a backflow inhibiting part for inhibiting the gas discharged to the preliminary exhaust chamber from flowing into the fuel chamber of the one unit cell.

According to the fuel cell of this embodiment, the backflow inhibiting part inhibits unreacted oxidizer derived from the oxidizer chamber of one. unit cell from mixing into the fuel chamber of other unit cell. Thereby, it is possible to inhibit useless fuel consumption caused by reactions non-contributive to the power generation at the fuel electrode. Further, the gas, which is discharged from the fuel chamber to the preliminary exhaust chamber in one unit cell, is prohibited from flowing back to the same fuel chamber.

The preliminary exhaust chamber may be provided with a backflow inhibiting part for inhibiting the gas discharged into the preliminary exhaust chamber from flowing into the oxidizer chamber of the other unit cell.

According to the fuel cell of this embodiment, the backflow inhibiting portion inhibits unreacted fuel and intermediate products, which are discharged from the fuel electrode of one unit cell, from flowing into the oxidizer chamber of the other unit cell. Thus, it is possible to inhibit useless fuel consumption caused by reactions non-contributive to the power generation at the oxidizer electrode. Further, the gas discharged from the fuel chamber to the preliminary exhaust chamber can be inhibited from flowing back to the same oxidizer chamber.

The fuel cell further may comprises a merging discharge structure for merging and discharging gas discharged from the fuel chamber of one unit cell and gas discharged from the oxidizer chamber of the other unit cell, wherein the merging discharge structure is placed in the preliminary exhaust chamber.

According to the fuel cell of this embodiment, the merging discharge structure placed in the preliminary exhaust chamber can efficiently discharge the gas discharged from the fuel electrode of one unit cell by making use of the flow of the gas discharged from the oxidizer chamber of the other unit cell.

The fuel cell further may comprise a backflow inhibiting part which is placed in the oxidizer chamber of the other unit cell and which inhibits gas in the oxidizer chamber from flowing back toward the oxidizer supply side.

According to the fuel cell of this embodiment, the gas in the oxidizer chamber can efficiently be discharged into the preliminary exhaust chamber because the backflow inhibiting portion placed in the oxidizer chamber of the other unit cell inhibits the gas in the oxidizer chamber from flowing back to the oxidizer supply side.

The merging discharge structure may be a diaphragm type pump which has a peripheral portion and a central portion both fixed to specified sites of the preliminary exhaust chamber.

According to the fuel cell of this embodiment, the diaphragm type pump, which serves as the merging discharge structure, makes it possible to effectively utilize a narrow space between the unit cells for suction and exhaust of the fuel, the oxidizer and the discharge gas.

The diaphragm type pump may have a discharge port formed near the central portion, sucks the gas from the peripheral portion, and discharges the gas from the discharge port formed near the central portion.

According to the fuel cell of this embodiment, by using the diaphragm type pump, the gas is sucked from a peripheral portion thereof and the gas is discharged from near the central portion. This shortens the flow passage length as compared with the case where gas is sucked from one end and exhausted from the other end, so that suction and exhaust efficiency can be enhanced.

The diaphragm type pump may have a valve mechanism which closes the discharge port in a suction mode and which opens the discharge port in a discharge mode.

According to the fuel cell of this embodiment, this diaphragm type pump serving as a merging discharge structure makes it possible to perform a suction and exhaust operation as well as a valve operation in leakage with the suction and exhaust operation simultaneously. This enhances the efficiency in suction and exhaust.

The diaphragm type pump may be provided with an electrostatic actuator as a drive part.

According to the fuel cell of this embodiment, the electrostatic actuator makes it possible to drive the diaphragm type pump even in a narrow space between unit cells. So, even when the pump is set in each of unit cells, it is possible to minimize power loss resulted from the drive system.

At least one of the oxidizer chamber and the preliminary exhaust chamber may be provided with a dew condensation part for condensing and storing moisture contained in gas discharged into the oxidizer chamber.

According to the fuel cell of this embodiment, it becomes possible to recover moisture from the dew condensation parts because moisture contained in the discharge gas is condensed and stored at the dew condensation part. Also, when the dew condensation part is formed on a wall surface of the oxidizer chamber or the preliminary exhaust chamber, dew condensation water is recovered on this wall surface. Accordingly, dew condensation water can be recovered efficiently without depending on the directions in which the fuel cell is used.

The dew condensation part may be formed on a wall surface of at least one of the oxidizer chamber and the preliminary exhaust chamber, and the dew condensation part has a lead passage for leading dew condensation water stored at the dew condensation part to the fuel chamber.

According to the fuel cell of this embodiment, it is possible to supply the dew condensation water from the dew condensation part to the nearest fuel chamber without routing the flow passage for recovery of the dew condensation water to outside the unit cells.

The fuel electrode and the oxidizer electrode of the multilayered unit cells may be formed in such a way as to cut out four corners of a rectangular shape of each electrode.

According to the fuel cell of this embodiment, the fuel cell can be formed more compact because a fuel supply passage and an oxidizer supply passage, which extend through in the layer-stacking direction, are placed in the four corners of the rectangular shape. Also, in a case where a diaphragm type pump is provided as the merging discharge structure, it is possible to improve efficiency of the diaphragm pump. This is because a shape of the diaphragm can be made closer to a circle by cutting out the four corners of the rectangular shaped fuel electrode and oxidizer electrode. In the case where unit cells are arrayed in a direction perpendicular to the layer-stacking direction of a plurality of unit cells, the fuel supply passage and the oxidizer supply passage can be placed in the four corners of the rectangular shape in such a way as to pass through the plurality of unit cells in the layer-stacking direction. Therefore, a clearance between adjoining unit cells in the perpendicular direction is reduced in comparison with the case where the unit cells are of the rectangular shape. This enhances the mounting density.

A fuel cell has been developed having a plurality of unit cells arrayed into a plane state, each of the unit cells comprising:
 a fuel electrode to which a liquid fuel is supplied and by which cations and electrons are generated from the liquid fuel;
 an electrolyte membrane which is placed so as to face the fuel electrode and through which cations derived from the fuel electrode permeate; and
 an oxidizer electrode to which an oxidizer is supplied and which is placed so as to face the electrolyte membrane and which yields a reaction between the oxidizer and the cations permeated through the electrolyte membrane, wherein
 the fuel electrode, the electrolyte membrane and the oxidizer electrode are continuously integrated between neighboring unit cells.

The fuel electrode, the electrolyte membrane and the oxidizer electrode may be continuously integrated between neighboring unit cells in the unit cells arrayed into a plane state. Thus, it is possible to achieve a reduction in parts count and a great reduction in production man-hours, as compared with the case where the unit cells separately have fuel electrodes, electrolyte membranes and oxidizer electrodes independently of one another.

The plurality of unit cells may be arrayed into a plane state make up one planar cell, and
 the fuel cell is formed by a plurality of planar cells multilayered.

According to the fuel cell of this embodiment, a capacity of the fuel cell can be set by the number of the multilayered planar cells.

The diaphragm type pump may have a valve mechanism which opens a suction port formed at the peripheral portion in a suction mode and which closes the suction port in a discharge mode.

According to the fuel cell of this embodiment, efficiency of the oxidizer suction through the suction port can be improved, while the gas in the oxidizer chamber can be prevented from flowing back to the suction port. As the result, it is possible to improve the discharge efficiency of the gas discharged from the oxidizer chamber to the discharge port.

The diaphragm type pump may also have a partitioning plate or a bar-like structural part which is placed at a discharge port formed near the central portion and which extends from the oxidizer chamber to the preliminary exhaust chamber in a layer-stacking direction.

According to the fuel cell of this embodiment, the gas flows smoothly from the oxidizer chamber to the discharge port, so that the discharge efficiency from the oxidizer chamber is improved.

The electrostatic actuator may have a drive electrode isolated from both the oxidizer chamber and the preliminary exhaust chamber in a gas non-communicating manner.

According to the fuel cell of this embodiment, water vapor discharged as a reaction product of the oxidizer electrode can be prevented from mixing into a space in which the drive electrode is present. Consequently, reliability and durability of the electrostatic actuator can be improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinbelow, a fuel cell will be described in detail by way of embodiments thereof illustrated in the accompanying drawings.

First Embodiment

Figure 1A:
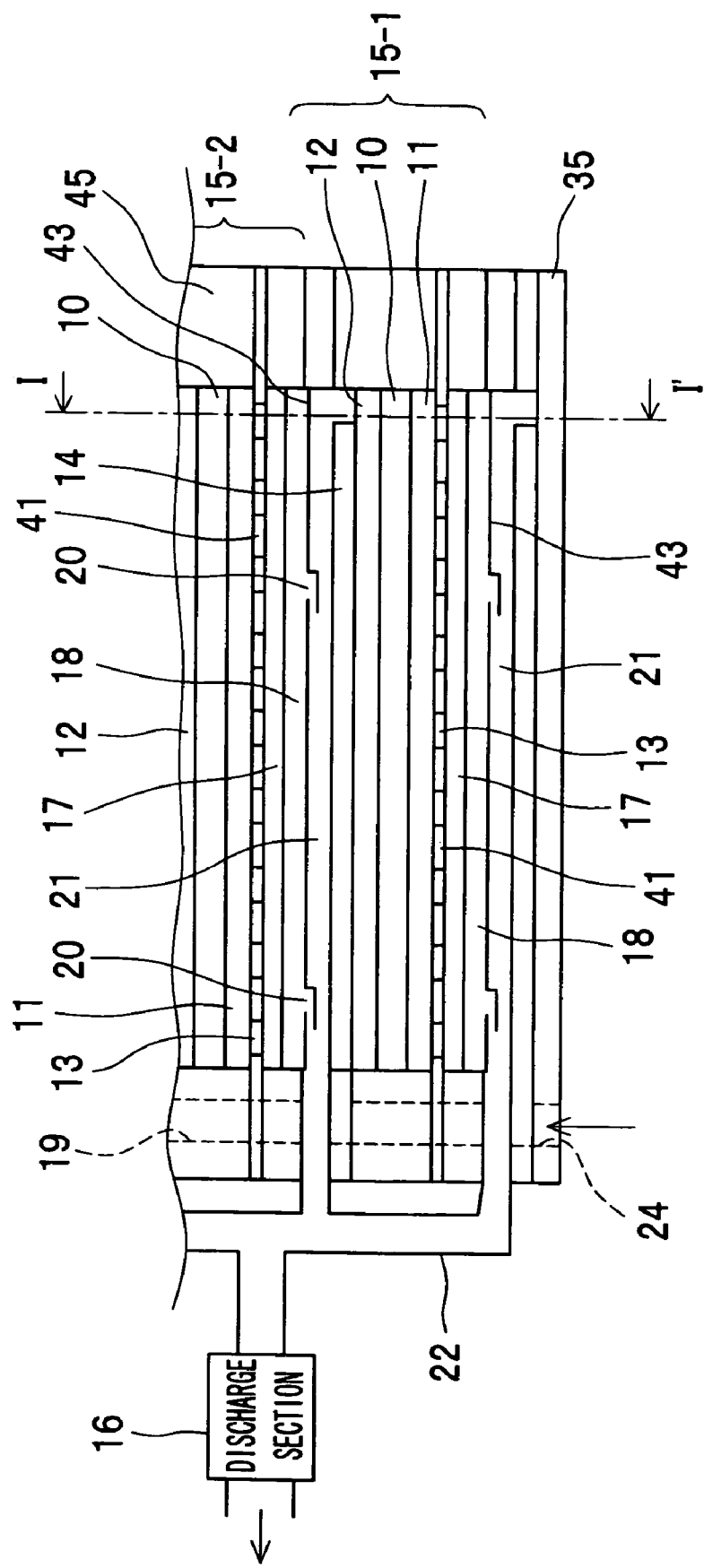
FIG. 1A is a sectional view of a fuel cell according to a first embodiment, taken along the line II-II' of FIG. 1C.
Figure 1B:
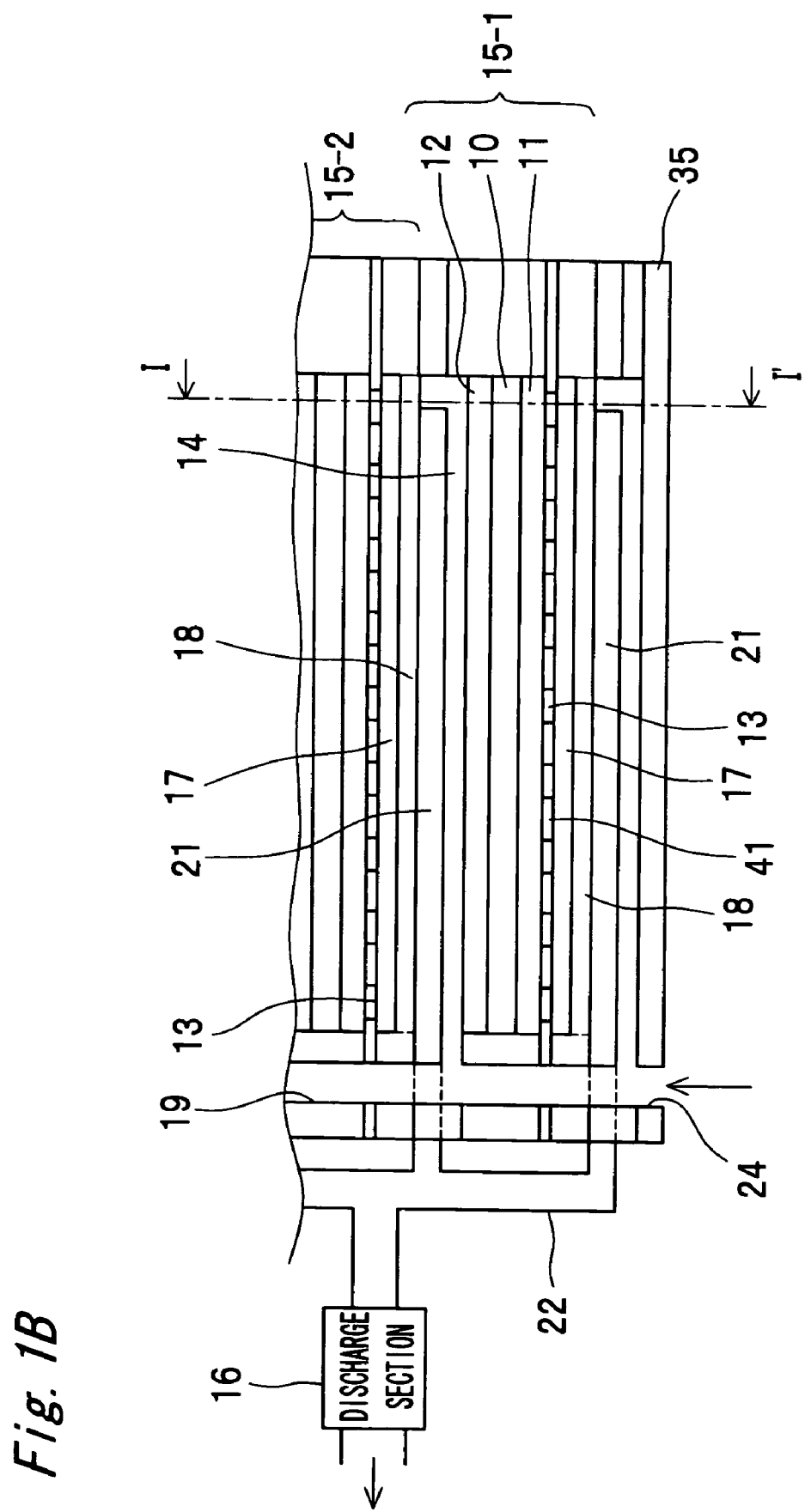
FIG. 1B is a sectional view of the fuel cell taken along the line III-III' of FIG. 1C.
Figure 1C:
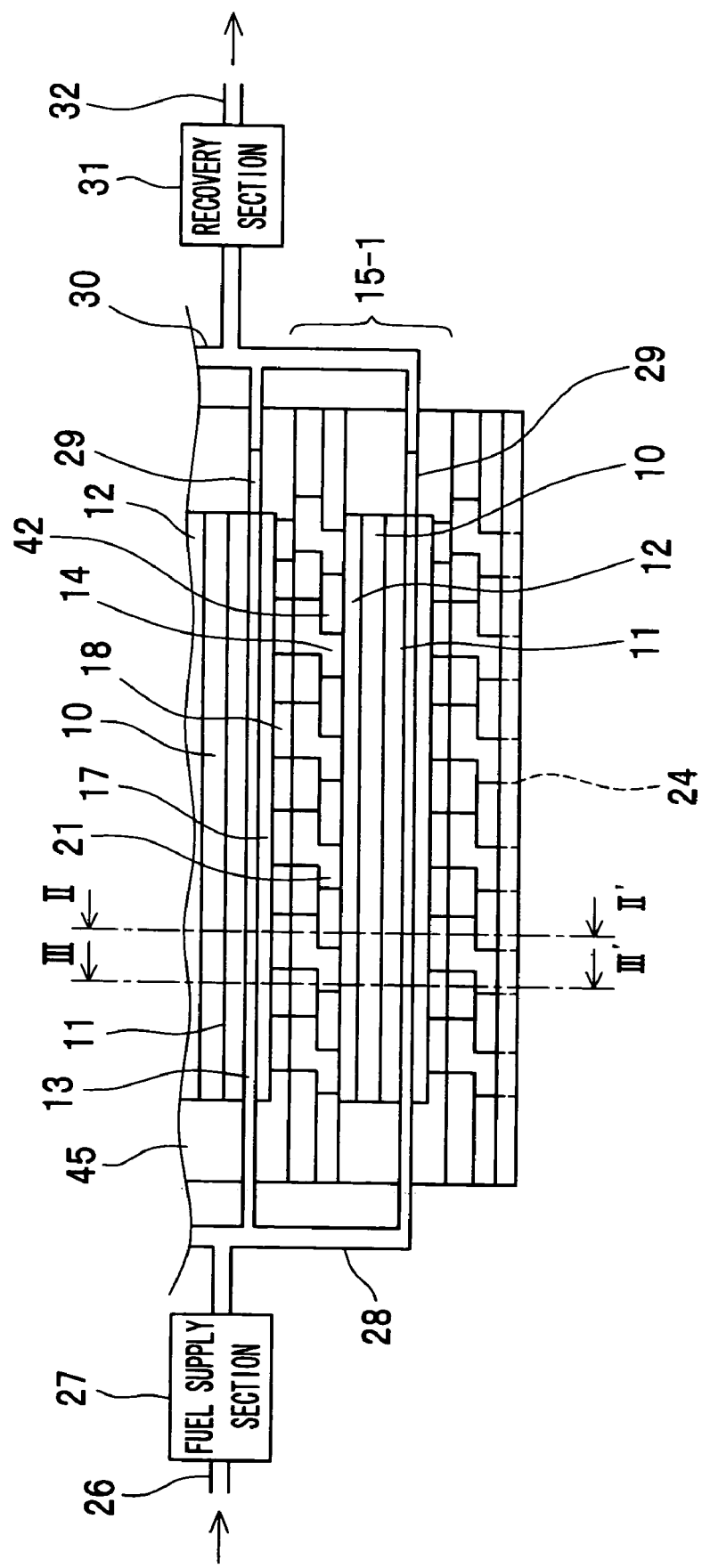
FIG. 1C is a sectional view of the fuel cell taken along the line I-I' of FIG. 1A.

With reference to FIGS. 1A, 1B, 1C, a first embodiment of the fuel cell is explained. FIG. 1A is a sectional view taken along the line II-II' of FIG. 1C. FIG. 1B is a sectional view taken along the line III-III' of FIG. 1C. FIG. 1C is a sectional view taken along the line I-I' of FIGS. 1A and 1B. As shown in FIGS. 1A to 1C, the fuel cell of this first embodiment includes a plurality of multilayered unit cells 15-1, 15-2 and so on. The unit cells 15-1, 15-2 and so on are generally similar in construction to one another, and housed in a housing 45.

A unit cell 15-1 includes a fuel electrode 11, an oxidizer electrode 12, an electrolyte membrane 10 sandwiched between the two electrodes 11, 12, a fuel chamber 13 adjacent to the fuel electrode 11, and an oxidizer chamber 14 adjacent to the oxidizer electrode 12. Carbon paper, sintered body of carbon, sintered metal of nickel or the like, foam metal, and porous silicon or other porous material may be used for a substrate for the fuel electrode 11 and the oxidizer electrode 12. Platinum-ruthenium alloy or alloys of platinum and gold, platinum and osmium, platinum and rhodium or the like may be used for the catalyst for the fuel electrode 11. A catalyst similar to that for the fuel electrode 11 may be used also for the oxidizer electrode 12. The oxidizer electrode 12 and the fuel electrode 11 may be of the same material. A heat-proof and acid-proof material having proton conductivity may be used for the electrolyte membrane 10, while it does not matter whether the material is organic or inorganic. In this embodiment, sulfonic group-containing perfluorocarbon ("Nafion 117" made by DuPont (registered trademark)) structurally based on organic fluorine-containing high polymers is used. The electrolyte membrane 10, which needs only to have the function of proton conductivity, may be one in which an electrolyte membrane is buried in some other base material.

In this embodiment, mixture of methanol and water is used as the liquid fuel to be supplied to the fuel electrode 11. However, the fuel is not limited to this. Hydrocarbon organic fuels such as ethanol or dimethyl ether may be used instead of methanol. Further, although air originally containing oxygen is used as the oxidizer in this embodiment, oxygen itself may also be used.

As shown in FIG. 1A, the fuel chamber 13 is partitioned into a plurality of chambers by a separator 41. A fuel-impervious substrate such as metal, silicon substrate, glass substrate or resin substrate may be used for the separators 41. In this embodiment, however, a silicon substrate subjected to fine processing is used. As shown in FIG. 1A, the separator 41 is sandwiched between the fuel electrode 11 and a gas-liquid separation membrane 17. This gas-liquid separation membrane 17 is almost impervious to the fuel of the fuel chambers 13, but pervious to the gas generated at the fuel electrode 11. In this embodiment, the gas-liquid separation membrane 17 is given by using a porous material having an average pore size of 0.1 micron or less as an example. An interposition plate 43 is placed with a specified interval with respect to the gas-liquid separation membrane 17. A preliminary exhaust chamber 18 is formed between the interposition plate 43 and the gas-liquid separation membrane 17.

Meanwhile, as shown in FIG. 1C, the oxidizer chamber 14 is partitioned into a plurality of chambers by a separator 42. For the separator 42, it is possible to use an oxidizer-impervious substrate such as metal, silicon substrate, glass substrate or resin substrate. In this embodiment, a silicon substrate subjected to fine processing is used. As shown in FIG. 1A, a discharge flow passage 21 is formed between the oxidizer chamber 14 of the unit cell 15-1 and an interposition plate 43 of the unit cell 15-2 adjacent to the oxidizer chamber 14. The interposition plate 43 has a discharge port 20 to communicate the preliminary exhaust chamber 18 with the discharge flow passage 21.

In this embodiment, as shown in FIG. 1A, there is an exhaust passage 22 which is connected through the wall of housing 45 to the discharge flow passages 21, 21, and so on of the individual unit cells 15-1, 15-2 and so on. The exhaust passage 22 is connected to a discharge section 16. A pump or micropump or the like may be used for the discharge section 16. The pump may be provided in a motor type or a diaphragm type.

As shown in FIG. 1C, a fuel supply passage 28 extending through the housing 45 is connected to each of the fuel chambers 13. The fuel supply passage 28 is connected to a fuel supply section 27 implemented by, for example, a micropump or pump or the like. The fuel supply section 27 has a fuel supply port 26 to which a fuel tank (not shown) is connected thereto, so that a liquid fuel is supplied from this fuel tank. The fuel supply section 27 formed by a pump or the like may be replaced with a construction that a liquid fuel is supplied to the individual fuel chambers 13 by making use of the capillary phenomenon of a porous material.

As shown in FIG. 1C, the fuel chambers 13 are connected to an exhaust passage 30 which runs through the housing 45 via a gas-liquid separation membrane 29 that is almost impervious to reactant gas and pervious only to the fuel. The exhaust passage 30 is led to a recovery passage 32 from a recovery section 31 that recovers the unreacted fuel. For example, a pump or micropump may be used for the recovery section 31, but the recovery section 31 is not necessarily needed when almost no unreacted fuel is discharged or when there is no need for recovering unreacted fuel. In this embodiment, the gas-liquid separation membrane 29 may also be omitted.

In the fuel cell of this first embodiment, the fuel is supplied from the fuel supply section 27 of FIG. 1C via the fuel supply passage 28 to the fuel chambers 13. The fuel penetrates into the fuel electrode 11, and reacts in the vicinity of an interface with the electrolyte membrane 10 having the catalyst contained therein in order to generate protons and electrons as well as carbon dioxide. The generated protons penetrate therefrom through the electrolyte membrane 10 to move to the oxidizer electrode 12. The electrons flow from the fuel electrode 11 via an external circuit (not shown) to the oxidizer electrode 12. Also, the generated carbon dioxide permeates from the fuel chambers 13 through the gas-liquid separation membrane 17, and discharges to the preliminary exhaust chamber 18 for fuel electrode use. In the gas-liquid separation membrane 17, the fuel is scarcely allowed to permeate therethrough, and only the generated gas is allowed to permeate therethrough.

Meanwhile, an oxidizer supply port 24 is formed in an end plate 35, and as shown in FIG. 1A, an oxidizer supply passage 19 adjoins the oxidizer supply port 24 so as to extend in the layer-stacking direction within the housing 45. Then, from the oxidizer supply port 24 via the oxidizer supply passage 19, air is supplied to the oxidizer chamber 14 of each unit cell. The air is diffused from the oxidizer chamber 14 into the oxidizer electrode 12, so that the protons diffused from the fuel electrode 11 react with oxygen in the oxidizer electrode 12 to generate water (water vapor). The generated water vapor, together with unreacted oxygen, goes to the discharge flow passage 21 via the oxidizer chamber 14 and merges with the carbon dioxide gas from the discharge port 20 so as to be discharged to the exhaust passage 22 located outside the housing 45.

Herein, the discharge port 20 has a function as an ejector. That is, the discharged gas (specifically, water vapor and unreacted oxygen) from the oxidizer chamber 14 of the unit cell 15-1 passes through the discharge flow passage 21 so as to be discharged toward the exhaust passage 22 in the discharge direction. In this process, by making use of a negative pressure generated in the vicinity of the discharge port 20, the gas (specifically, carbon dioxide) discharged via the fuel chambers 13 to the preliminary exhaust chamber 18 can be discharged in such a manner as to be involved in the discharge direction within the discharge flow passage 21. Therefore, the discharge gas on the fuel electrode 11 side can also be discharged with high efficiency from the unit cell region toward the exhaust passage 22.

In this embodiment, by virtue of the inclusion of the discharge section 16, a flow of discharge gas can be stably formed in the discharge flow passage 21 of each unit cell. Also, at the same time, it is possible to stably reduce a pressure of the preliminary exhaust chamber 18 through the discharge port 20. Therefore, a pressure different due to this pressure reduction makes it possible to efficiently discharge the gas led into the fuel chambers 13 and going through the gas-liquid separation membrane 17.

Thus, according to the fuel cell of this embodiment, the exhaust structure does not cause any decreases in interfacial regions between the electrolyte membrane 10 and the fuel electrode 11 or the oxidizer electrode 12, where reactions take place in the interfacial regions. Therefore, no power density decreases. Moreover, the discharge gas is exhausted through the exhaust passage 22, so that exhaust loss of the discharge gas can be lessened, with the result of good discharge efficiency.

Further, the discharge flow passage 21, which is provided outside the regions of the unit cells 15-1, 15-2 and so on, merges, for example, the exhaust gas derived from the oxidizer electrode 12 of the unit cell 15-1 and the discharge gas derived from the fuel electrode 11 of the unit cell 15-2, and discharges them. That is to say, one discharge flow passage 21 is used in common for the oxidizer electrode 12 of the unit cell 15-1 and the fuel electrode 11 of the unit cell 15-2. Further, the discharge gas derived from the fuel electrode 11 is extremely smaller in quantity than the discharge gas derived from the oxidizer electrode 12 which has a higher ratio of emission of unreacted gas. Therefore, the power generation section, which is formed of the stacked layers of the unit cells 15-1, 15-2 and so on, has almost no volume increase due to the presence of the discharge flow passage 21. This contributes to improvement in the power-generation output density per volume.

Furthermore, in this embodiment, adjacent unit cells 15-1 and 15-2 for example are so placed that the oxidizer electrode 12 of the unit cell 15-1 and the fuel chambers 13 of the unit cell 15-2 come close each other. This makes it possible to set the oxidizer chamber 14 of the unit cell 15-1 closest to the fuel chamber 13 of the unit cell 15-2, as shown in FIG. 1A. Therefore, the preliminary exhaust chamber 18 on the side of the fuel electrode 11 can be connected with the discharge flow passage 21 on the side of the oxidizer electrode 12 in the shortest distance.

In the lowermost unit cell 15-1, as in the case of other unit cells 15-2 and so on, the fuel chamber 13 is provided with the preliminary exhaust chamber 18, the interposition plate 43, the discharge flow passage 21, and an end plate 35 in place of the oxidizer electrode. As a result, like the other unit cells, it becomes possible for the end unit cell unit cell 15-1 to exhaust the exhaust gas from the fuel electrode 11. Thus, in the multilayered structure of a plurality of unit cells, it is possible to suppress increase in the multilayer thickness due to connections of flow passages to a minimum.

In this embodiment, though the discharge section 16 is provided as shown in FIG. 1A, it may be omitted.

Second Embodiment

The fuel cell according to a second embodiment is described with reference to FIG. 2. In the second embodiment, like the first embodiment, a plurality of multilayered unit cells 55-1, 55-2 and so on are included. The unit cells 55-1, 55-2 and so on are generally similar in construction to one another, and housed in a housing 75. The housing 75 has an end plate 89.

A unit cell 55-1 has a fuel electrode 51, an oxidizer electrode 52, an electrolyte membrane 50 sandwiched between the two electrodes 51, 52, a fuel chamber 53 adjacent to the fuel electrode 51, and an oxidizer chamber 54 adjacent to the oxidizer electrode 52. The fuel electrode 51, the oxidizer electrode 52 and the electrolyte membrane 50 in this second embodiment are similar in construction to the fuel electrode 11, the oxidizer electrode 12 and the electrolyte membrane 10, respectively, in the first embodiment. Also, the liquid fuel to be supplied to the fuel electrode 51 in the second embodiment is similar to the liquid fuel supplied to the fuel electrode 11 of the first embodiment. The oxidizer to be supplied to the oxidizer electrode 52 is also similar to that in the first embodiment.

A separator 73 which partitions the fuel chamber 53 into a plurality of chambers is similar in construction to the separator 41 of the first embodiment. Also, a separator (not shown) which partitions the oxidizer chamber 54 into a plurality of chambers is similar in construction to the separator 42 of the first embodiment. A gas-liquid separation membrane 77 which sandwiches the separator 73 in cooperation with the fuel electrode 51 is also similar in construction to the gas-liquid separation membrane 17 of the first embodiment.

The unit cell 55-2 has a preliminary chamber 58 adjacent to the gas-liquid separation membrane 77. The preliminary chamber 58 is partitioned by an interposition plate 76. The interposition plate 76 is opened at its center. Then, a preliminary exhaust chamber 61 is formed between the interposition plate 76 of the unit cell 55-2 and the oxidizer electrode 52 of the unit cell 55-1 adjacent to the unit cell 55-2. The preliminary exhaust chamber 61 has a role of merging together the gas discharged from the oxidizer chamber 54 and the gas discharged from the fuel chamber 53, and a role of leading the gases to a discharge port 67. The preliminary exhaust chamber 61 and the oxidizer chamber 54 are partitioned each other by a diaphragm 68 and a fixed valve 69. The diaphragm 68 has its peripheral portion 68C fixed to the housing 75. The diaphragm 68 is opened at its central portion. Also, as shown in FIG. 3B, a central portion 69A of the fixed valve 69 is fixed to an intersecting portion 68B which extends across a central annular portion 68A at the central portion of the diaphragm 68. The fixed valve 69 is fixed to the interposition plate 76 for example, so as to be fixed for its position within the preliminary exhaust chamber 61.

Figure 2:
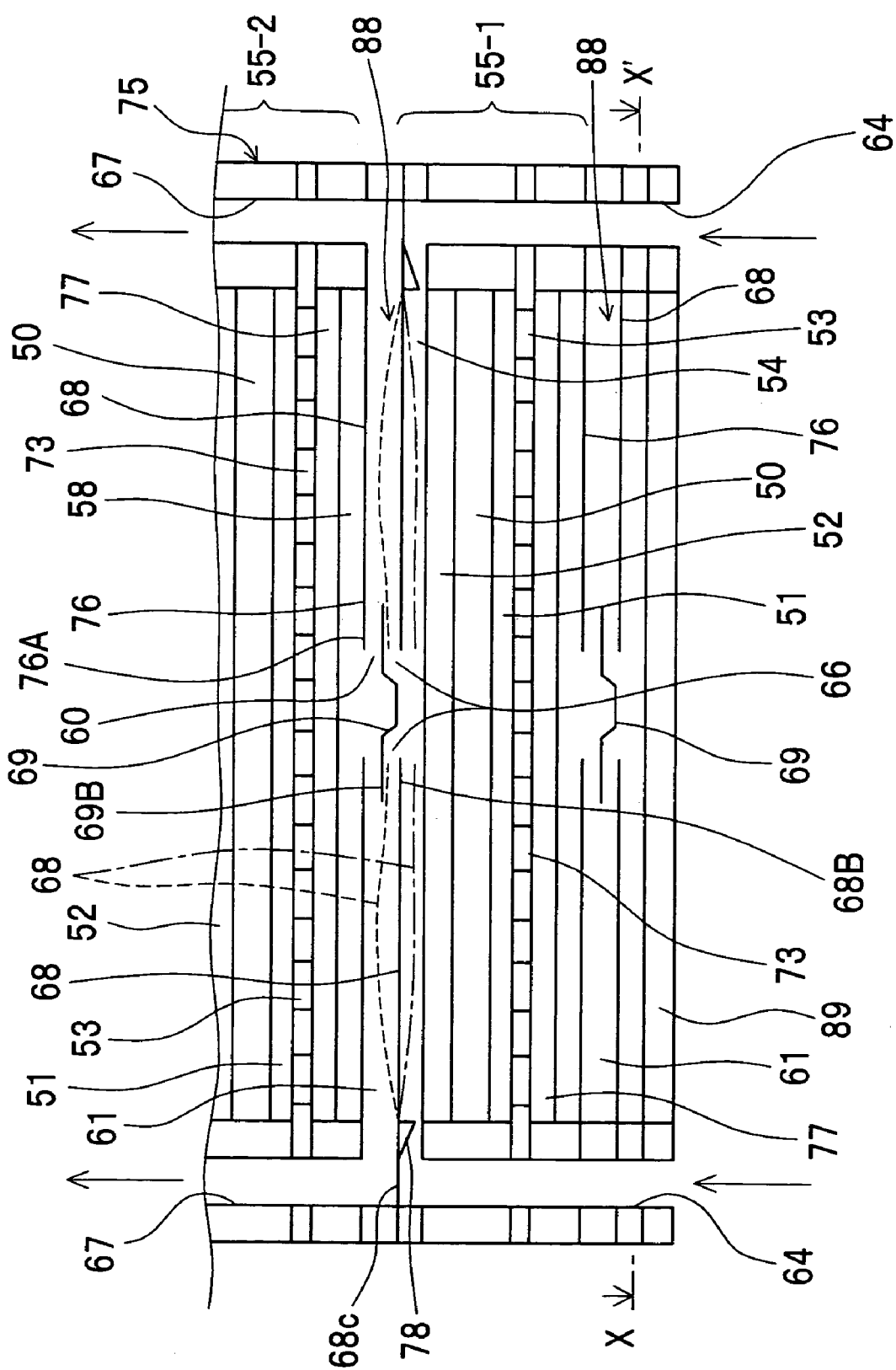
FIG. 2 is a sectional view of the fuel cell according to a second embodiment.

As shown in FIG. 2, an annular portion 69B of the fixed valve 69 is opposed to the central annular portion 68A of the diaphragm 68 in a layer-stacking direction, and moreover opposed to a central annular portion 76A of the interposition plate 76 in the layer-stacking direction. A discharge port (throttle) 60 is formed by a clearance between the central annular portion 76A of the interposition plate 76 and the annular portion 69B of the fixed valve 69. The discharge port 60 is a port for discharging the gas, which has been discharged into the fuel chamber 53, from the preliminary chamber 58 to the preliminary exhaust chamber 61. On the other hand, an exhaust port 66 is formed by a clearance between the central annular portion 68A of the diaphragm 68 and the annular portion 69B of the fixed valve 69. The exhaust port 66 is a port for discharging the gas, which has been discharged into the oxidizer chamber 54, to the preliminary exhaust chamber 61. The oxidizer chamber 54 communicates with an oxidizer suction port 64 which extends in the housing 75 along the layer-stacking direction. Also, the diaphragm 68 has a backflow preventing portion 78 formed on a portion of the diaphragm 68 radially inwardly adjacent to the oxidizer suction port 64. The backflow preventing portion 78 has a wedge-shaped cross section. Specifically, the backflow preventing portion 78, while increasing its thickness in the direction of layer-stacking, extends radially inward from around a radial outer end of the oxidizer chamber 54 within a specified length. The backflow preventing portion 78 fulfills a role of preventing the oxidizer introduced into the oxidizer chamber 54 from flowing back to the oxidizer suction port 64.

The preliminary exhaust chamber 61 communicates with the discharge port 67 extending along the layer-stacking direction in the housing 75. The diaphragm 68 and the fixed valve 69 constitute a diaphragm type pump 88.

In this second embodiment, the discharge gas derived from the fuel electrode 51 is merged with the discharge gas derived from the oxidizer chamber 54 in the preliminary exhaust chamber 61. The preliminary exhaust chamber 61 is placed downstream of the oxidizer chamber 54 and lower in pressure than the oxidizer chamber 54. Therefore, even if the discharge gas derived from the fuel electrode 51 contains gas serving as fuel, such as vaporized methanol and intermediate products of reaction process, it is possible to prevent the gas serving as fuel from diffusing into the oxidizer chamber 54 because of the difference in pressure. As the result, it is possible to suppress reactions non-contributive to the power generation at the oxidizer electrode 54.

Further, in the second embodiment, the discharge port 60 formed in the preliminary exhaust chamber 61 serves as a throttle. Thus the discharge port 60 inhibits the gas discharged to the preliminary exhaust chamber 61 from flowing back to the fuel chamber 53. The discharge port 60 is formed in such a way that the discharge gas is flowed and exhausted from the oxidizer chamber 54 through the exhaust port 66. A negative pressure is generated near the outlet of the discharge port 60 by flowing the gas discharged from the oxidizer chamber 54 to the exhaust port 66 in the vicinity of the discharge port 60. As a result, the discharge gas is flowed from the preliminary chamber 58 to the preliminary exhaust chamber 61. Thus, it is possible to inhibit the gas, which is discharged from the preliminary chamber 58 to the preliminary exhaust chamber 61, from flowing back to the fuel chamber 53. Thus, the oxidizer can be inhibited from mixing into the fuel chamber 53. As the result, it is possible to suppress fuel consumption caused by reactions non-contributive to power generation.

Further, in this embodiment, the exhaust port 66 formed in the preliminary exhaust chamber 61 inhibits flow-back of the gas discharged from the oxidizer chamber 54 to the preliminary exhaust chamber 61. That is, the exhaust port 66 is narrower than the discharge port 67 adjoining the preliminary exhaust chamber 61 so that the flow resistance may become larger at the exhaust port 66. Accordingly, the exhaust port 66 makes it hard that the gas discharged to the preliminary exhaust chamber 61 can flow back to the oxidizer chamber 54. Therefore, it becomes less likely that the unreacted fuel and intermediate products discharged from the fuel electrode 51 flows into the oxidizer chamber 54. Thus, it is possible to suppress reactions non-contributive to the power generation at the oxidizer electrode 52, so that the wasteful fuel consumption can be suppressed.

Further, the second one embodiment fourth includes the diaphragm type micropump 88 as shown in FIG. 2. The diaphragm type micropump 88 serves as a merging discharge section, which discharge the gas discharged from within the fuel chamber 53 together with the gas discharged from the oxidizer chamber 54 to the preliminary exhaust chamber 61. In a suction mode, the diaphragm type micropump 88 sucks air as an oxidizer from the oxidizer suction port 64 into the oxidizer chamber 54 and, in an exhaust mode, discharges the gas within the oxidizer chamber 54 from the exhaust port 66 to the discharge port 67. As a result, a flow of the discharge gas from the oxidizer chamber 54 makes it possible to efficiently discharge the above-stated discharge gas together with the discharge gas from the oxidizer chamber 54.

Figure 3A:
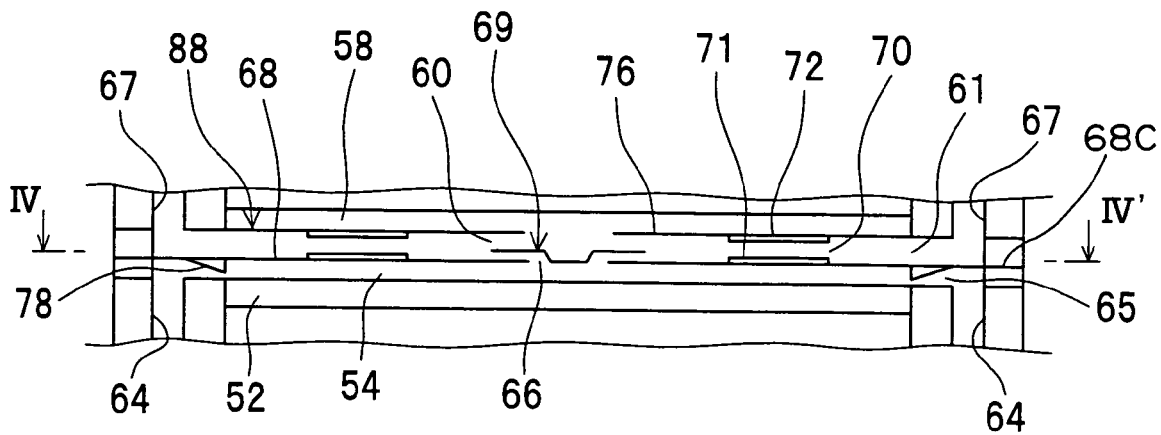
FIG. 3A is a sectional view of a diaphragm type micropump 88 in the second embodiment, taken along the line V-V' of FIG. 3B.
Figure 3B:
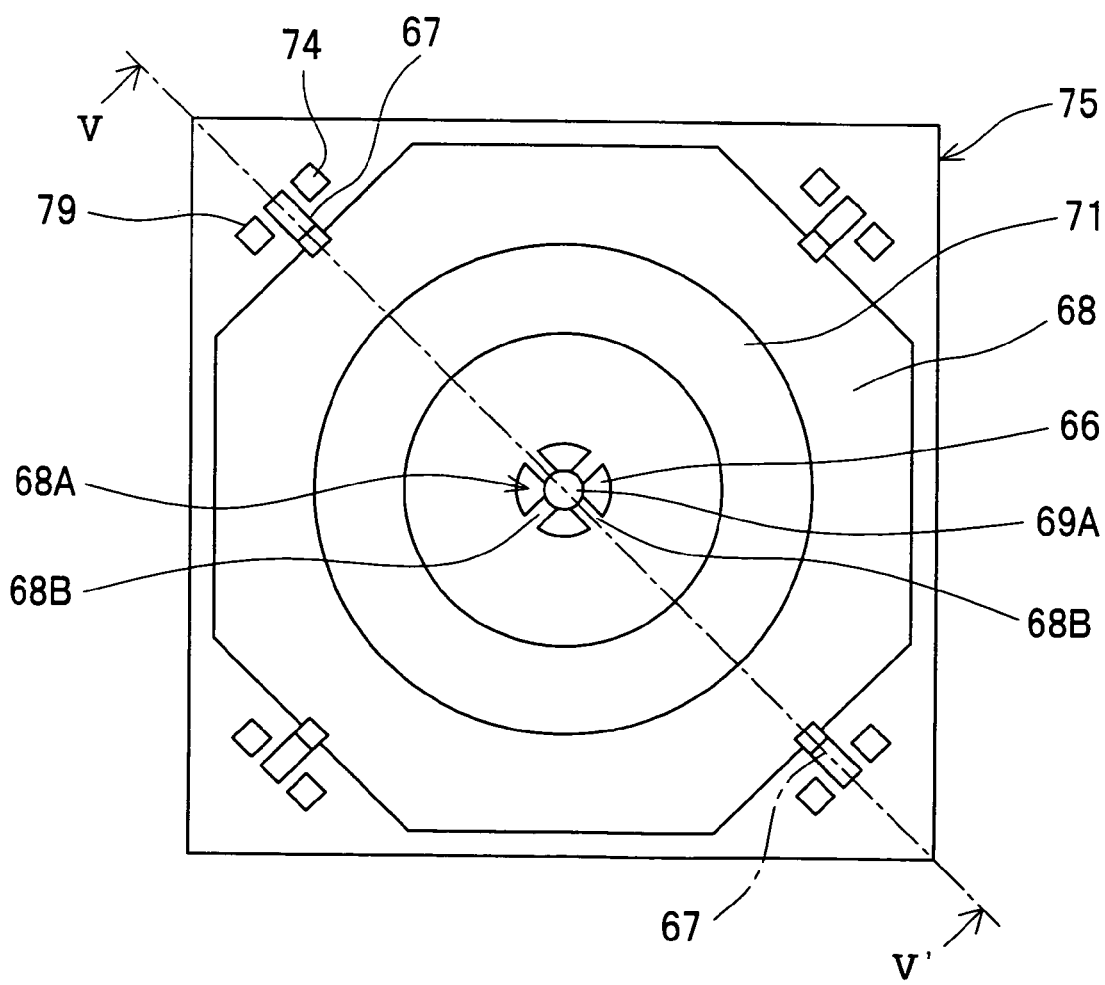
FIG. 3B is a sectional view of the diaphragm type micropump 88, taken along the line IV-IV' of FIG. 3A.

In the second embodiment, as shown in FIGS. 3A and 3B, the diaphragm type micropump 88 is a pump driven by an electrostatic actuator 70. Specifically, the electrostatic actuator 70 has a fixed electrode 72 fixed to the interposition plate 76, and a movable electrode 71 fixed to the diaphragm 68. The fixed electrode 72 is opposed to the movable electrode 71 in the layer-stacking direction within the preliminary exhaust chamber 61. It is noted that FIG. 3A is a cross section taken along the line V-V' of FIG. 3B, and that FIG. 3B is a cross section taken along the line IV-IV' of FIG. 3A.

In the diaphragm type pump 88, when the electrostatic actuator 70 is turned on, the fixed electrode 72 attracts the movable electrode 71. Consequently, as shown by short dash lines in FIG. 2, the diaphragm 68 is curved toward the interposition plate 76, so that the oxidizer chamber 54 expands. As the result, air is sucked through the oxidizer suction port 64 into the oxidizer chamber 54. When this occurs, the central annular portion 68A of the diaphragm 68 overlaps and contacts the annular portion 69B of the fixed valve 69 so as to close the exhaust port 66. Thereby, it becomes possible to prevent the gas from flowing back from the preliminary exhaust chamber 61 to the oxidizer chamber 54. When the electrostatic actuator 70 is turned off, as shown by alternate long and short dash lines in FIG. 2, the diaphragm 68 is curved toward the oxidizer electrode 52 due to a counteraction of turn-on, that is, as the result of change from turn-on to turn-off. Therefore, the gas in the oxidizer chamber 54 is efficiently exhausted to the preliminary exhaust chamber 61 through the exhaust port 66 which is largely opened. In other words, the curving of the diaphragm 68 causes the exhaust port 66 to be largely opened, which makes it possible to improve the efficiency in gas exhaust. In this embodiment, the intersecting portion 68B located at the central portion of the diaphragm 68 is fixed to the central portion 69A of the fixed valve 69 as shown in FIG. 3B. Thereby, the diaphragm 68 shown in the alternate long and short dash lines in FIG. 2 is curved in such a way that a portion of the diaphragm 68 to which the movable electrode 71 is fixed approaches the most to the oxidizer electrode 52. Such a curving of the diaphragm 68 makes it possible to discharge the discharge gas from the oxidizer chamber 54 via the exhaust port 66 to the preliminary exhaust chamber 61 with high efficiency while suppressing backflow of the oxidizer from the oxidizer chamber 54 to the oxidizer suction port 64.

In this embodiment, as described above, the backflow preventing portion 78 is provided at a suction port 65 of the oxidizer chamber 54. This backflow preventing portion 78 inhibits the backflow of the gas from the oxidizer chamber 54 to the oxidizer suction port 64 during the exhaust process with use of the diaphragm type pump 88. Therefore, it is possible to discharge the gas from the oxidizer chamber 54 to the preliminary exhaust chamber 61 with high efficiency.

In the second embodiment, the peripheral portion 68C of the diaphragm 68 is fixed to the housing 75, and the intersecting portion 68B is fixed to the fixed valve 69. The diaphragm type pump 88, which serves as a merging discharge part, is placed in the preliminary exhaust chamber 61. This structure makes it possible to perform suction and exhaust of the gas under the sate of effective utilization of a narrow space of the preliminary exhaust chamber 61 formed between the unit cells 55-1 and 55-2. Also, the diaphragm type pump 88, which serves as the merging discharge part, makes it possible to shorten the flow passage length as compared with pumps which perform suction from one end and exhaust from the other end. This is because the diaphragm type pump 88 performs suction from the peripheral portion 68C of the diaphragm 68 and performs exhaust from the fixed valve 69 located at the center. Thus, the diaphragm type micropump 88 makes it possible to enhance the suction and exhaust efficiency.

In the second embodiment, the micro fixed valves 69 is provided at the discharge port 60 and the exhaust port 66 which form the central exhaust part. Thereby, valve operations are conducted in linkage with suction and exhaust operations simultaneously. Therefore, it is possible to enhance efficiency in suction and exhaust. Furthermore, the diaphragm type micropump 88 is driven by the electrostatic actuator 70, and therefore it becomes possible to drive the pump 88 even in the narrow space of the preliminary exhaust chamber 61 between the unit cells 55-1 and 55-2. Still, the electrostatic actuator 70 is capable of driving at lower voltage as the space is narrower. Thus, it is possible to suppress power loss due to the drive system to a small one even when the micropump 88 is set for each unit cell.

Figure 4:
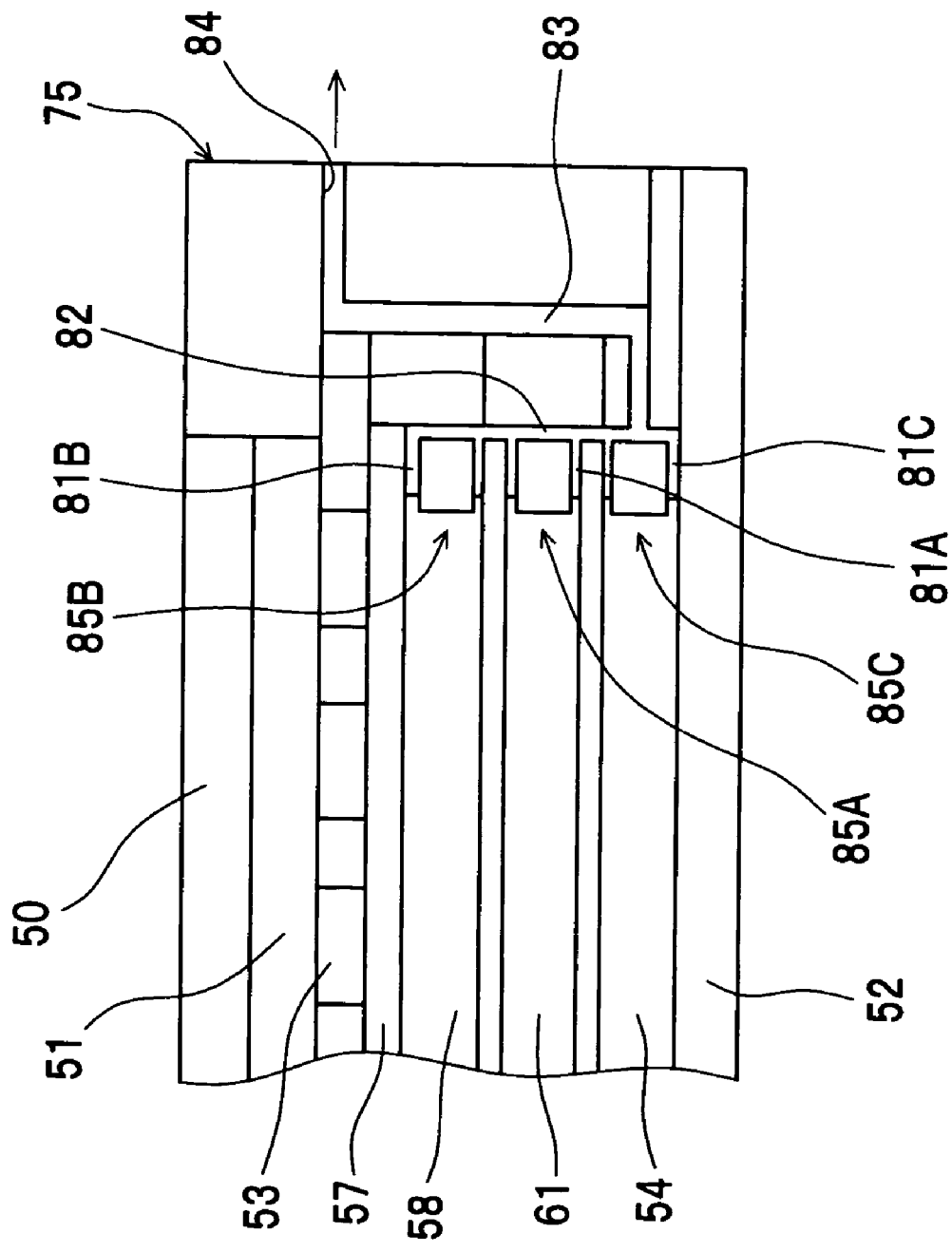
FIG. 4 is a partial sectional view showing a modification of the second embodiment.

In the second embodiment, the preliminary exhaust chamber 61, the preliminary chamber 58 and the oxidizer chamber 54 may have dew condensation parts 85A, 85B, 85C, respectively, near the side wall as shown in FIG. 4. These dew condensation parts 85A, 85B, 85C have flow passages 81A, 81B, 81C. The flow passages 81A-81C of the dew condensation parts 85A-85C communicate with an internal passage 82, and further communicate with a flow passage 83 and a flow passage 84 formed in the housing 75. The flow passage 84 is connected to the fuel chamber 53. In this embodiment, moisture contained in discharge gas is condensed and stored at the dew condensation parts 85A-85C. So, it becomes possible to recover moisture from the dew condensation parts 85A-85C. Also, the dew condensation parts 85A-85C are formed on wall surfaces of the preliminary exhaust chamber 61, the preliminary chamber 58 and the oxidizer chamber 54, respectively, so that dew condensation water can be recovered on those wall surfaces. Accordingly, it becomes possible to efficiently recover dew condensation water independently of the direction in which the fuel cell is used. Also, the flow passages 81A-81C, the flow passage 82 and the flow passage 83 may supply the dew condensation water from the dew condensation parts 85A-85C, which are formed on the wall surfaces, to the nearest fuel chamber 53. This is conducted without routing the flow passage for recovery of dew condensation water to outside of the unit cells 55-1, 55-2. Besides, these flow passages 81A-81C, passage 82 and flow passage 83 make use of the capillary action, and therefore, the dew condensation water can be recovered with high efficiency. Further, guide grooves for may be formed in the preliminary exhaust chamber 61, the preliminary chamber 58 and the oxidizer chamber 54 in order to guide the dew condensation water into the flow passages 81A-81C and the flow passage 82.

The wall surfaces of the preliminary chamber 58, the oxidizer chamber 54 and the preliminary exhaust chamber 61 are located at peripheral end portions of electrodes (i.e. fuel electrode 51 and oxidizer electrode 52) where power generation reactions take place. Therefore, these wall surfaces are lower in temperature as compared with places near the centers of the preliminary chamber 58, oxidizer chamber 54 and the preliminary exhaust chamber 61. Thus, it becomes possible to efficiently condense and recover water vapor, which is discharged from the oxidizer chamber 54, on the wall surfaces of the preliminary chamber 58, the oxidizer chamber 54 and the preliminary exhaust chamber 61. In addition, the wall surfaces of the preliminary chamber 58, the oxidizer chamber 54 and the preliminary exhaust chamber 61 are easily heat-exchanged by the discharge port 67 and the flow passages 77, 79 (discharge ports of unit cells other than the unit cells 55-1, 55-2) which pass through within the housing 75, as shown in FIG. 3B. As the result, these wall surfaces are lower in temperature than the places near the centers.

Mobile equipment such as portable telephones for example, which are considered as the principal use of small-size fuel cells, is put into use in inclined positions in many cases. Accordingly, the fuel cell itself is more often used in variously inclined positions. Accordingly, it is preferable that dew condensation water can be recovered efficiently without depending on the direction of use. This is achieved, as described above, by recovering the dew condensation water on the peripheral wall surfaces of the preliminary chamber 58, the oxidizer chamber 54 and the preliminary exhaust chamber 61.

In the second embodiment, as shown in FIG. 3B, multilayered unit cell 55-1, unit cell 55-2 and so on have the fuel electrode 51 and the oxidizer electrode 52, and each electrode is formed into an octagonal shape by cutting out four corners of a rectangular shape. As a result, an oxidizer supply passage 64 and a fuel supply passage, which are flow passages extending in the layer-stacking direction, can be laid out around the periphery of the fuel electrode 51 and the oxidizer electrode 52 with symmetry at generally equal distances from the center thereof. Thereby, it becomes possible to more easily supply the fuel and the oxidizer entirely to the fuel electrode 51 and oxidizer electrode 52, in comparison with the case where the fuel electrode 51 and the oxidizer electrode 52 are formed into a rectangular shape. It is also possible to efficiently drive the diaphragm type micropump 88 at a low voltage. This is because the diaphragm 68 can be formed into an octagonal shape by cutting out four-corners of the rectangular shape in the fuel electrode 51 and the oxidizer electrode 52, which octagonal shape is closer to a circular shape than rectangular shape.

Further, it is possible to reduce the flow passage loss by placing large cross-sectional passages in the other multilayered unit cells or in the layer-stacking direction at cut portions where the four corners of the rectangular shape are cut out in the housing 75. In this way, the cut-out four-corner regions of the rectangular shape can be effectively used. Therefore, when the unit cells are arrayed in a direction perpendicular to the layer-stacking direction of a plurality of unit cells, it is possible to reduce a clearance between adjoining unit cells by placing the fuel supply passage or the oxidizer supply passage in the four corners of the rectangular shape, in comparison with the case where .the unit cell is of a rectangular shape and the four corners are not used. Thus, the mounting density can be enhanced while the electrode area is maintained at a maximum. Besides, it is also possible to place wiring lines in the four corners so as to connect among electrodes of the multilayered unit cells.

As described above, the power generation section of the fuel cell is not made out of one layer of unit cell but made out of multilayered unit cells. Thereby, it becomes possible to reduce the floor area of the fuel cell, so that the power generation output density per floor area can be enhanced. Meanwhile, in order to realize the power generation section as small as possible in volume, it is inevitably required to make thinner the flow passages for the electrode-use fuel chamber and the oxidizer chamber located between multilayered unit cells. However, making thinner the flow passages so as to reduce the cross sections may increase the resistance of the flow passages, which causes the burden on the supply system (i.e., electric power consumed by the supply system) to increase, resulting in a power loss of the fuel cell, so that it becomes impossible to enhance the cell power per volume.

A typical example of the above is explained with reference to a structure identical to that in the second embodiment as shown in FIGS. 2 and 3A, 3B. In this example, a total film thickness of the electrolyte membrane 50, the fuel electrode 51 and the oxidizer electrode 52 is set to about 0.5 mm, a thickness from the fuel chamber 53 to the preliminary chamber 58 is set to 0.2 mm, and a thickness of the oxidizer chamber 54 is set to 0.2 mm. In stacking of the micropump 88 in each layer, the micropump is subject to constraints on its thickness. Accordingly, the movable range of the micropump 88 is subject to constraints, and its capacity of suction and exhaust is also subject to constraints. For a specific example, unit cells are stacked in three layers, and the micropumps 88 as shown in FIG. 3 are provided for each of the layers. According a trial calculation, for supply of the oxidizer (air) in an amount necessary to achieve a target cell power per electrode unit area of the unit cells by the micropumps 88, it has been found that one side length of an electrode per layer of the multilayered unit cells should be set to 6 mm or less so as to suppress the area of electrode. This is applicable even if PDMS (polydimethylsiloxane) of a small Young's modulus is used for the movable portions of the micropumps 88 so that the movable range is enlarged. Enlarging the electrode area to the above or more would result in a more-than-expected burden on the oxidizer supply system to supply the oxidizer of a necessary amount per unit cell. In this way, a plurality of cells having one side length of 6 mm or less for example are placed for one layer and a plurality of such layers are stacked. Thereby, it is possible to shorten the length of the supply flow passage for the inside of the unit cell in comparison with the case where one layer of the same floor area is formed out of a unit cell, even if the flow passages for the electrode-use fuel chamber and the oxidizer chamber, which are located between the multilayered unit cells, are made thin as in the above example. Also, by utilizing pass-through flow passages placed in the four corners of the unit cell as described above, it is possible to make short the supply routes for fuel and oxidizer and the discharge route for the discharge gas, wherein these routes are placed in narrow spaces between multilayered unit cells for the cells of every layer. As a result, the burden on the oxidizer supply system can be suppressed within an expected range and the cell power per volume of the fuel cell can be enhanced.

In the second embodiment, the fuel electrode 51 and the oxidizer electrode 52 of the multilayered unit cells 55-1, 55-2 and so on have an octagonal shape. However, those may also be formed into polygonal shapes other than the octagonal shape.

Third Embodiment

Figure 5:
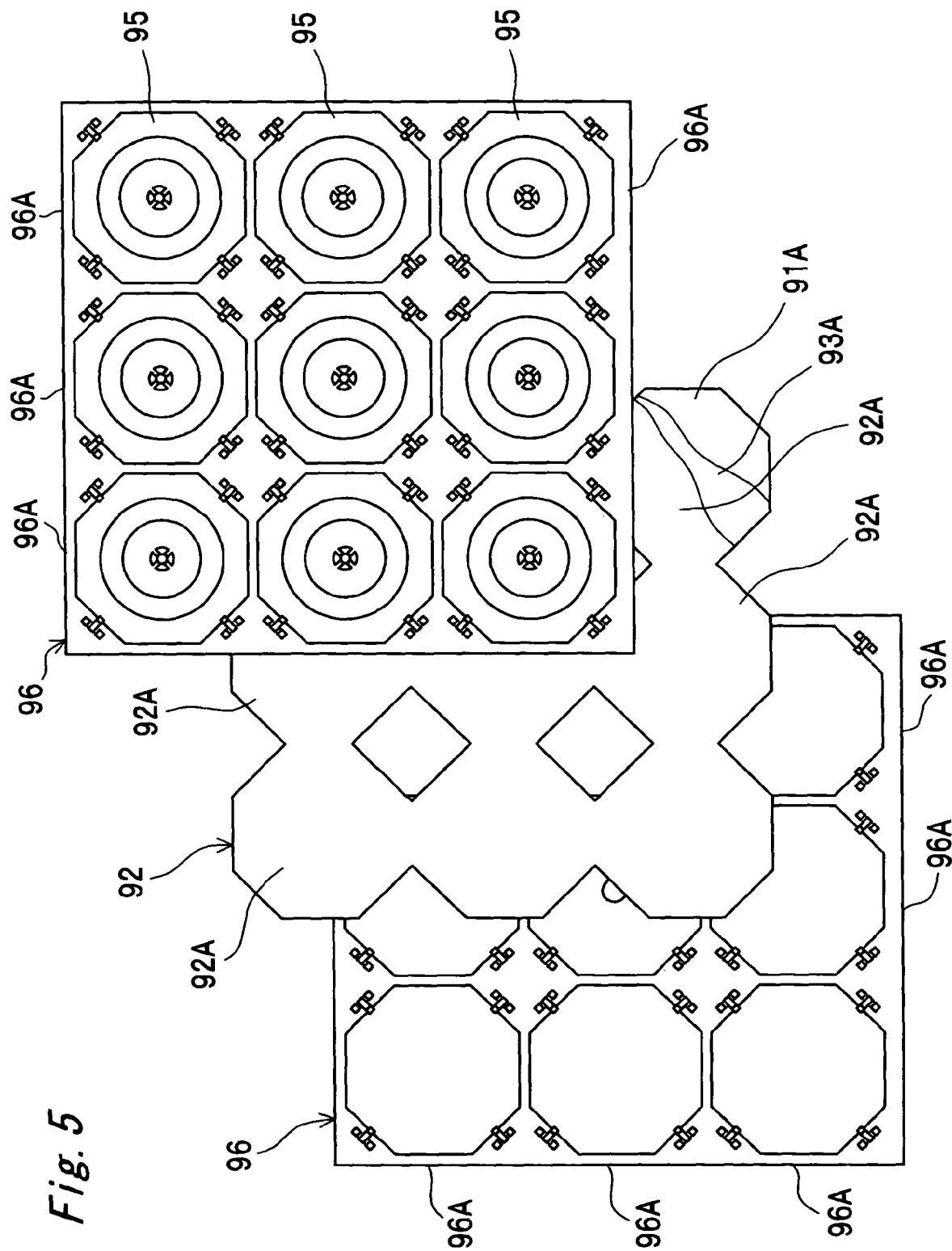
FIG. 5 is a sectional view of the fuel cell according to a third embodiment.
Figure 6:
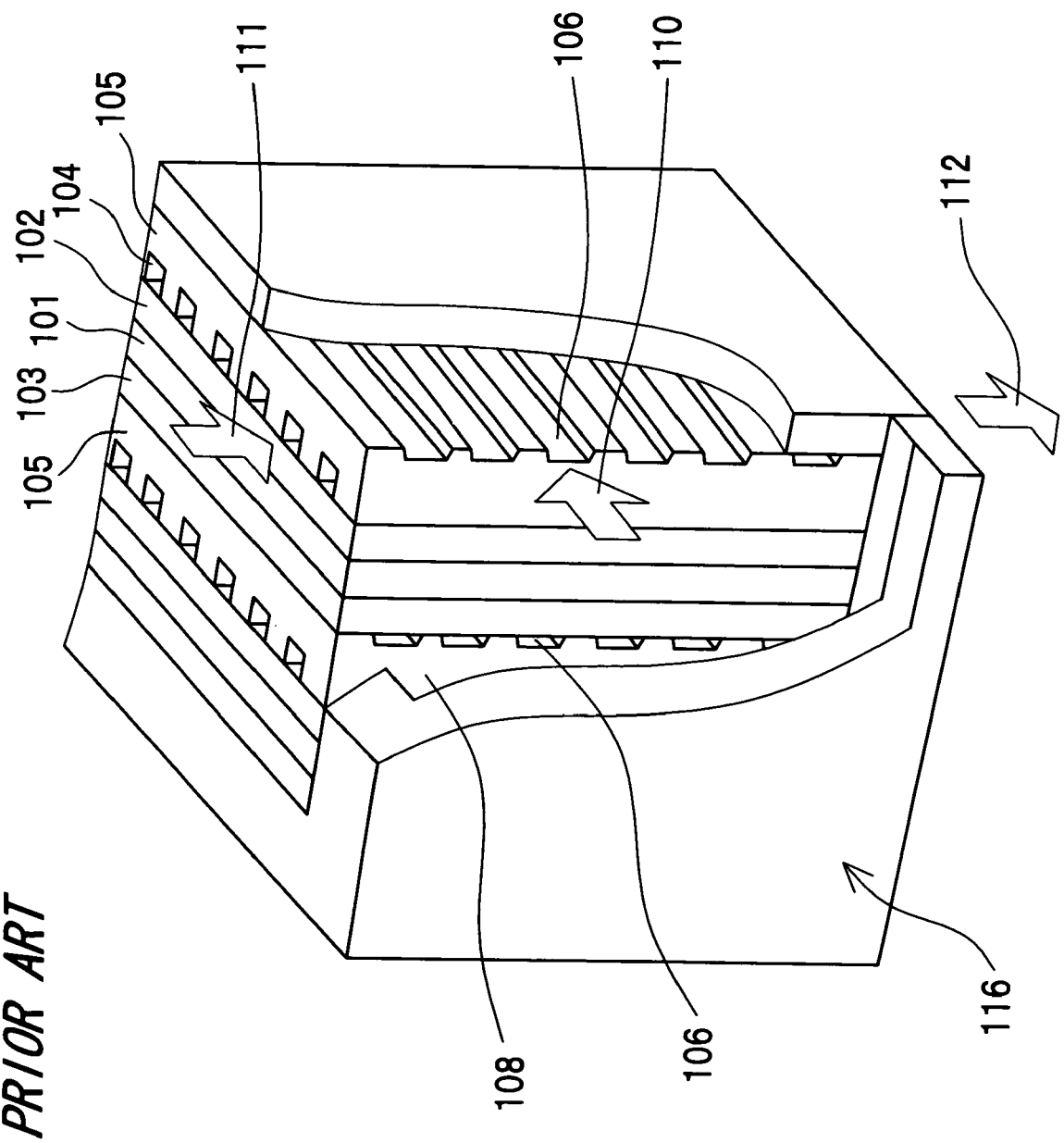
FIG. 6 is a schematic view sowing a construction of a conventional fuel cell.

The fuel cell according to a third embodiment is explained with reference to FIG. 5. FIG. 5 shows three cross sections of the fuel cell of the third embodiment in a partly overlapping state. An uppermost cross section among the three cross sections corresponds to the cross section shown in FIG. 3B for the second embodiment. A lowermost cross section among the three cross sections corresponds to a cross section taken along the X-X line of FIG. 2 for the second embodiment.

In the third embodiment, nine unit cells are arrayed into a plane state. Specifically, the fuel cell of the third embodiment has one fuel electrode 91, and the fuel electrode 91 is formed in such a way that portions 91A are arrayed in three rows and three columns into a plane state and integrated together, wherein the portion 91A is similar to the fuel electrode 51 of the unit cell 55-1 in the fuel cell of the second embodiment. Also, the fuel cell of the third embodiment has one oxidizer electrode 92, and the oxidizer electrode 92 is formed in such a way that portions 92A are arrayed in three rows and three columns into a plane state and integrated together, wherein the portion 92A is similar to the oxidizer electrode 52 of the unit cell 55-1 of the second embodiment. Also, the fuel cell of the third embodiment has one electrolyte membrane 93, and the electrolyte membrane 93 is formed in such a way that portions 93A are arrayed in three rows and three columns into a plane state and integrated together, wherein the portion 93A is similar to the electrolyte membrane 50 of the unit cell 55-1. The portions 91A of one fuel electrode 91, the portions 92A of one oxidizer electrode 92, and the portions 93A of one electrolyte membrane 93 are each multilayered as in the case with the fuel electrode 51, the oxidizer electrode 52, and the electrolyte membrane 50.

Further, each of the nine unit cells in this third embodiment has the oxidizer chamber 54, the preliminary chamber 58, the preliminary exhaust chamber 61, the gas-liquid separation membrane 77, the oxidizer chamber (not shown), the preliminary chamber (not shown), the preliminary exhaust chamber (not shown) and the gas-liquid separation film (not shown), which the fuel cell of the second embodiment have. Also, each of the nine unit cells of the third embodiment has a diaphragm type pump 95 similar to the diaphragm type pump 88 which the fuel cell of the second embodiment has.

The fuel cell in this third embodiment also has one housing 96 to house the unit cells which are arrayed into a plane state. The housing 96 is formed in such a way as to include portions 96A arrayed in three rows and three columns into a plane state and integrated together, ranging from the end plate 89 to the diaphragm type pump 88 included in the housing 75 which the fuel cell of the second embodiment has.

According to the fuel cell of the third embodiment, the fuel electrode 91, the electrolyte membrane 93 and the oxidizer electrode 92 in the nine unit cells arrayed into a plane state are continuously adjoined together so as to be integrated between neighboring unit cells. This makes it possible to achieve a reduction in parts count and a great reduction in production man-hours, as compared with the case where the nine unit cells have separate fuel electrodes, electrolyte membranes and oxidizer electrodes, respectively, independently of one another. A plurality of the planar cells, each of which is formed by the nine unit cells arrayed into a plane state, may also be multilayered as in the case of the second embodiment.

In the third embodiment, nine unit cells are arrayed into a plane state. However, the number of unit cells to be arrayed into a plane state is not limited to nine. In addition, the number of rows may be different from the number of columns.

Fourth Embodiment

Figure 7A:
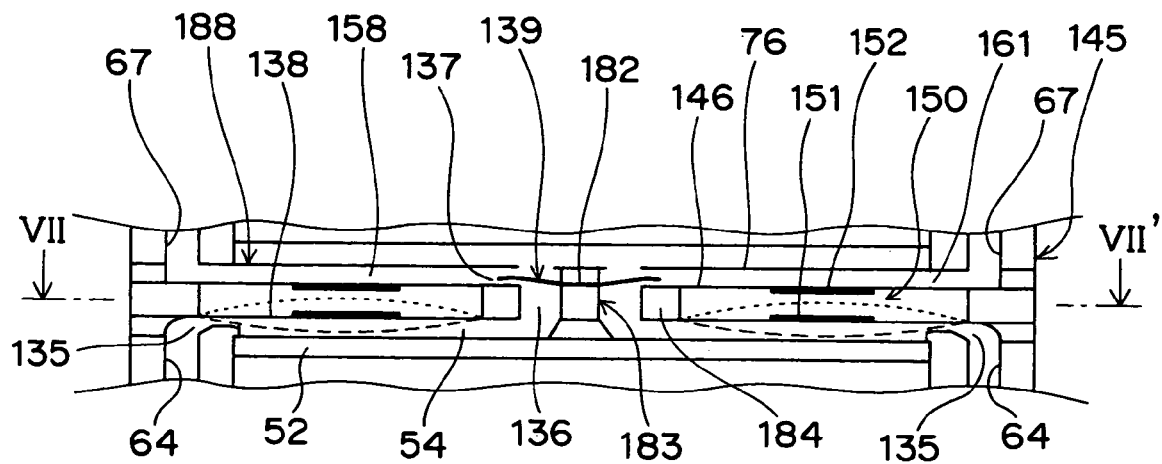
FIG. 7A is a sectional view of a diaphragm type micropump 188 in a fourth embodiment, taken along the line VIII-VIII' of FIG. 7B.
Figure 7B:
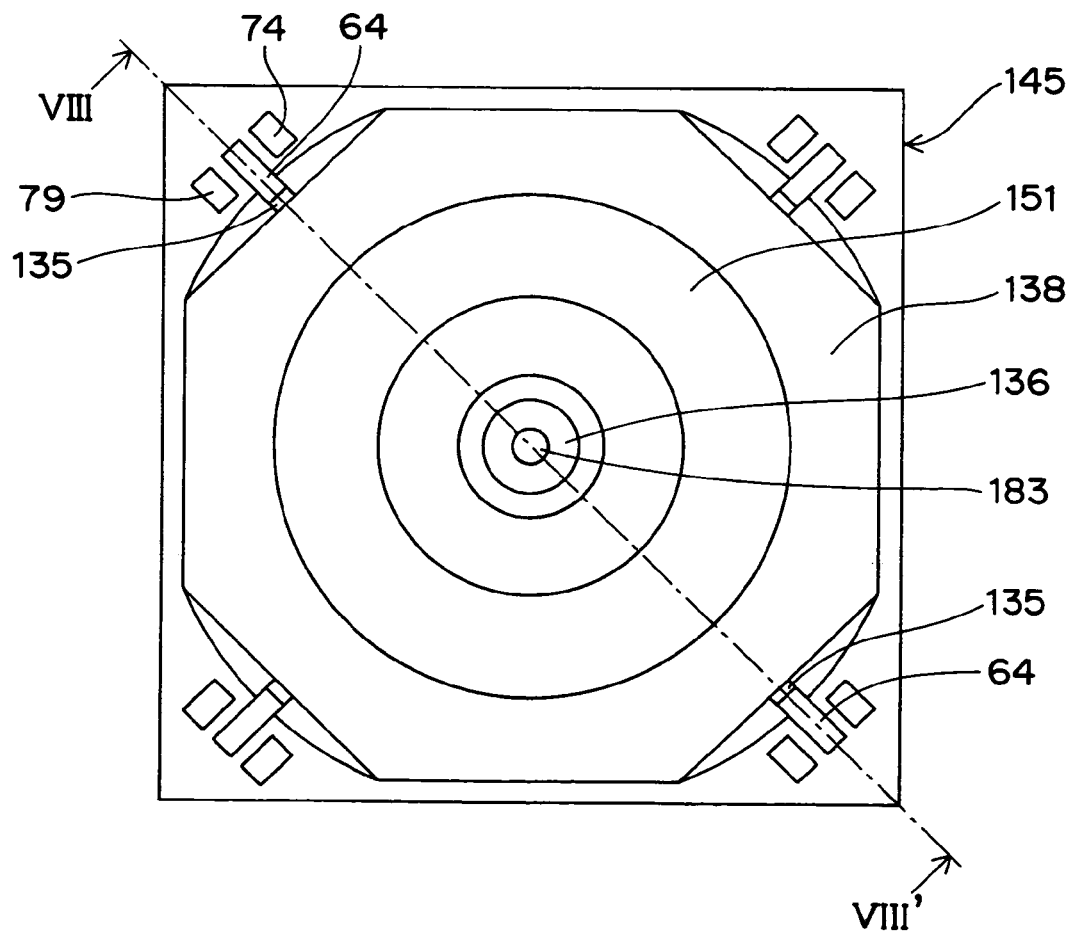
FIG. 7B is a sectional view of the diaphragm type micropump 188, taken along the line VII-VII' of FIG. 7A.

A fourth embodiment is explained as a more preferred embodiment with reference to FIGS. 7A and 7B. FIG. 7A is a sectional view showing a cross section taken along the line VIII-VIII' of FIG. 7B. FIG. 7B is a sectional view showing a cross section taken along the line VII-VII' of FIG. 7A. The fourth embodiment is a modification of the second embodiment. Therefore, identical component members are designated by the identical reference numerals to those of the second embodiment. Points different from the second embodiment are described principally.

In the fourth embodiment, a diaphragm type pump 188 is provided as shown in FIGS. 7A and 7B. The diaphragm type pump 188 has a diaphragm 138 and an interposition plate 146. The interposition plate 146. is separated from the diaphragm 138 by a specified distance in the layer-stacking direction. Central portions of the diaphragm 138 and the interposition plate 146 are fixed to a spacer portion 184 which forms part of a housing 145. Peripheral portions of the diaphragm 138 and the interposition plate 146 are fixed to the housing 145.

A movable electrode 151 is fixed to the diaphragm 138. A fixed electrode 152, as a drive electrode, is fixed to the interposition plate 146. The fixed electrode 152 and the movable electrode 151 form an electrostatic actuator 150. The diaphragm 138 extends up to a neighborhood of a suction port 135 placed in the periphery of the oxidizer chamber 54. Reference numerals 74, 79 in FIG. 7B denote flow passages which form discharge ports for other unit cells.

When the electrostatic actuator is turned on, the fixed electrode 152 attracts the movable electrode 151 so that the diaphragm 138 is curved toward the interposition plate 146 as shown by short dash lines in FIG. 7A. This causes the oxidizer chamber 54 to expand.

In this state, the suction port 135 of the oxidizer chamber 54 is largely opened, which makes it possible to improve the suction efficiency for the oxidizer from the oxidizer suction port 64. Meanwhile, when the electrostatic actuator is turned off, the diaphragm 138 is curved toward the oxidizer electrode 52 as shown by long dash lines in FIG. 7A, because of a counteraction from the curved state. Therefore, the oxidizer chamber 54 is contracted, which causes the suction port 135 of the oxidizer chamber 54 to be closed. As a result, the gas in the oxidizer chamber 54 can be prevented from flowing back to the oxidizer suction port 64. Accordingly, it is possible to improve the efficiency in gas discharge from the exhaust port 136 which is a discharge port placed around a center of the oxidizer chamber 54.

A flexible valve 139 is mounted on a valve fixed portion 182 which is fixed to the interposition plate 76. The valve 139, upon expansion of the oxidizer chamber 54, is closed at its opening portion 137 due to a pressure reduction in the oxidizer chamber 54. Thereby, the gas in a preliminary exhaust chamber 161 is prevented from flowing back into the oxidizer chamber 54. Thus, it is possible to improve the suction efficiency for the oxidizer chamber 54. On the other hand, upon contraction of the oxidizer chamber 54, the valve 139 is largely opened at its opening portion 137 due to an increase in pressure of the oxidizer chamber 54. Thus, it is possible to improve the exhaust efficiency.

Figure 8:
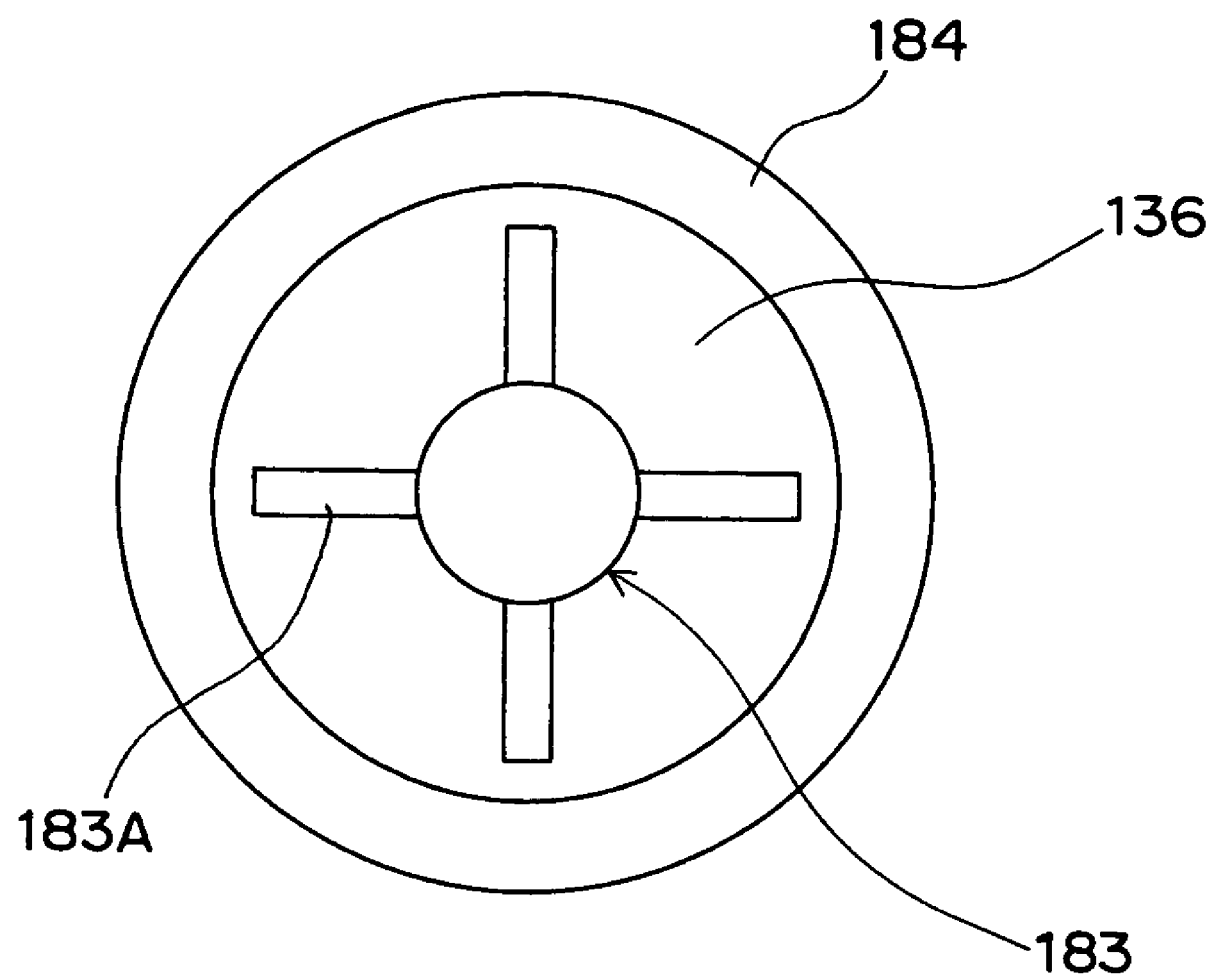
FIG. 8 is a sectional view showing partitioning plates 183A of a bar-like structural part 183 within an exhaust port 136 of the fourth embodiment.

Further, a bar-like structural part 183 is provided at the exhaust port 136. The bar-like structural part 183 extends from the oxidizer chamber 54 to the preliminary exhaust chamber 61 in the layer-stacking direction. A partitioning plate may be provided instead of the bar-like structural part 183. The bar-like structural part 183 allows the gas, which is flowed into the oxidizer chamber 54 from the periphery thereof, to flow smoothly to the central exhaust port 136. This improves the efficiency of discharge from the oxidizer chamber 54. The bar-like structural part 183 may be equipped with partitioning plates 183A which partitions the exhaust port 136 into a plurality of regions, as shown in FIG. 8. In addition, FIG. 8 is a sectional view of a vertical plane in the layer-stacking direction. The presence of the partitioning plates 183A makes it possible to rectify the flow-of gas at the exhaust port 136.

In this embodiment, as shown in FIG. 7A, the electrostatic actuator 150 of a diaphragm type pump 158 has the movable electrode 151 and the fixed electrode 152. The movable electrode 151 and the fixed electrode 152 are isolated from the oxidizer chamber 54 and the preliminary exhaust chamber 161 by the interposition plate 146 and the diaphragm 138. As the result, those electrodes 151, 152 are not communicated with the gas in the chambers 54, 161. Therefore, it is possible to prevent water vapor, which is discharged as a reaction product of the oxidizer electrode 52, from mixing into the atmosphere where the fixed electrode 152 and the movable electrode 151 are provided as a drive electrode. Thereby, reliability and durability of the electrostatic actuator 150 can be improved.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A fuel cell having a plurality of multilayered unit cells, wherein the unit cells are arranged in a stack and each of the unit cells comprising:
　　a fuel chamber to which a liquid fuel is supplied;
　　a fuel electrode adjacent the fuel chamber and to which the liquid fuel is supplied from the fuel chamber and by which cation and electrons are generated from the liquid fuel;
　　an electrolyte membrane adjacent the fuel electrode and through which cations derived from the fuel electrode permeate;
　　an oxidizer chamber to which an oxidizer is supplied and which is separate from the fuel chamber of the unit cell; and
　　an oxidizer electrode which is adjacent to the oxidizer chamber and to which the oxidizer is supplied from the oxidizer chamber and which is placed so as to face the electrolyte membrane and which yields a reaction between the oxidizer and the cations permeated through the electrolyte membrane, wherein
　　gas generated from the fuel electrode in a first unit cell among unit cells is discharged into the fuel chamber of the first unit cell;
　　gas generated from the oxidizer electrode of the first unit cell is discharged into the oxidizer chamber for the first unit cell;
　　gas generated from the fuel electrode in a second unit cell among the multilayered unit cells is discharged into the fuel chamber of the second unit cell, wherein the second unit cell is adjacent to the first unit cell in the stack, and the fuel chamber of the first unit cell adjoins the oxidizer chamber of the third unit cell;

gas generated from the oxidizer electrode of the second unit cell is discharged into the oxidizer chamber of the second unit cell;

the gas in the oxidizer chamber of the first unit cell and the gas in the fuel chamber of the second unit cell are merged with each other to be discharged from the multilayered unit cells, wherein a preliminary exhaust chamber between the fuel chamber of the first unit cell and the oxidizer chamber of the third unit cell leads the gas discharged from the fuel chamber of the first unit cell and the gas discharged from the oxidizer chamber of the third unit cell to a gas discharge port, and the gas in the fuel chamber of the first unit cell is merged with gas in the oxidizer chamber of a third unit cell adjacent to the first unit cell in the stack.

2. The fuel cell as set forth in claim 1, further comprising a first merging discharge structure for merging and discharging gas discharged from the fuel chamber of the second unit cell and gas discharged from the oxidizer chamber of the first unit cell and a second merging discharge structure separate from the first merging discharge structure, for merging and discharging gas discharged from the fuel chamber of the first unit cell and gas discharged from the oxidizer chamber of the third unit cell.

3. The fuel cell as set forth in claim 1, wherein the preliminary exhaust chamber is provided with a backflow inhibiting part for inhibiting the gas discharged to the preliminary exhaust chamber from flowing into the fuel chamber of the first unit cell.

4. The fuel cell as set forth in claim 1, wherein the preliminary exhaust chamber is provided with a backflow inhibiting part for inhibiting the gas discharged into the preliminary exhaust chamber from flowing into the oxidizer chamber of the third unit cell.

5. The fuel cell as set forth in claim 1, further comprising a merging discharge structure for merging and discharging gas discharged from the fuel chamber of first unit cell and gas discharged from the oxidizer chamber of the third unit cell, wherein the merging discharge structure is placed in the preliminary exhaust chamber.

6. The fuel cell as set forth in claim 5, further comprising a backflow inhibiting part which is placed in the oxidizer chamber of the third unit cell and which inhibits gas in the oxidizer chamber from flowing back toward the oxidizer chamber.

7. The fuel cell as set forth in claim 5, wherein the merging discharge structure is a diaphragm type pump which has a peripheral portion and a central portion both fixed to the preliminary exhaust chamber.

8. The fuel cell as set forth in claim 7, wherein the diaphragm type pump has a discharge port formed near the central portion, sucks the gas from the peripheral portion, and discharges the gas from the discharge port formed near the central portion.

9. The fuel cell as set forth in claim 8, wherein the diaphragm type pump has a valve mechanism which closes the discharge port in a suction mode and which opens the discharge port in a discharge mode.

10. The fuel cell as set forth in claim 7, wherein the diaphragm type pump is provided with an electrostatic actuator as a drive part.

11. The fuel cell as set forth in claim 1, further comprising a preliminary exhaust chamber between the fuel chamber of the first unit cell and the oxidizer chamber of the third unit cell so as to lead discharged from the fuel chamber of the first unit cell and gas discharged from the oxidizer chamber of the third unit cell to a discharge port gas, wherein at least one of the oxidizer chamber and the preliminary exhaust chamber is provided with a dew condensation part for condensing and storing moisture contained in gas discharged into the oxidizer chamber.

12. The fuel cell as set forth in claim 11, wherein further comprising a preliminary exhaust chamber between the fuel chamber of the first unit cell and the oxidizer chamber of the third unit cell so as to lead discharged from the fuel chamber of the first unit cell and gas discharged from the oxidizer chamber of the third unit cell to a discharge port gas the dew condensation part is formed on a wall surface of at least one of the oxidizer chamber and the preliminary exhaust chamber, and the dew condensation part has a lead passage for leading dew condensation water stored at the dew condensation part to the fuel chamber.

13. The fuel cell as set forth in claim 1, wherein the fuel electrode and the oxidizer electrode of each of the multilayered unit cells are formed in such a way as to cut out four corners of a rectangular shape of each electrode.

14. The fuel cell as set forth in claim 8, wherein the diaphragm type pump has a valve mechanism which opens a suction port formed at the peripheral portion in a suction mode and which closes the suction port in a discharge mode.

15. The fuel cell as set forth in claim 8, wherein the diaphragm type pump has a partitioning plate or a bar-like structural part which is placed at a discharge port formed near the central portion and which extends from the oxidizer chamber to the preliminary exhaust chamber in a layer-stacking direction.

16. The fuel cell as set forth in claim 10, wherein the electrostatic actuator has a drive electrode isolated from both the oxidizer chamber and the preliminary exhaust chamber in a gas non-communicating manner.

17. The fuel cell as set forth in claim 1 wherein the gas in the oxidizer chamber of the second unit cell is merged with gas in the fuel chamber of a fourth unit cell and the fourth unit cell is adjacent to the second unit cell.

* * * * *